Oct. 20, 1936.  E. C. ELKINS  2,057,771
PIPE COUPLING
Filed April 7, 1936  2 Sheets-Sheet 1
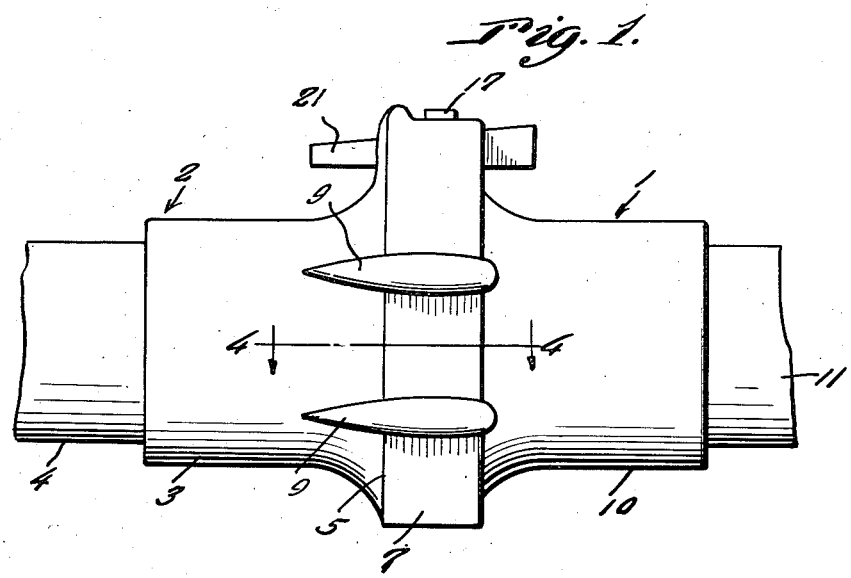
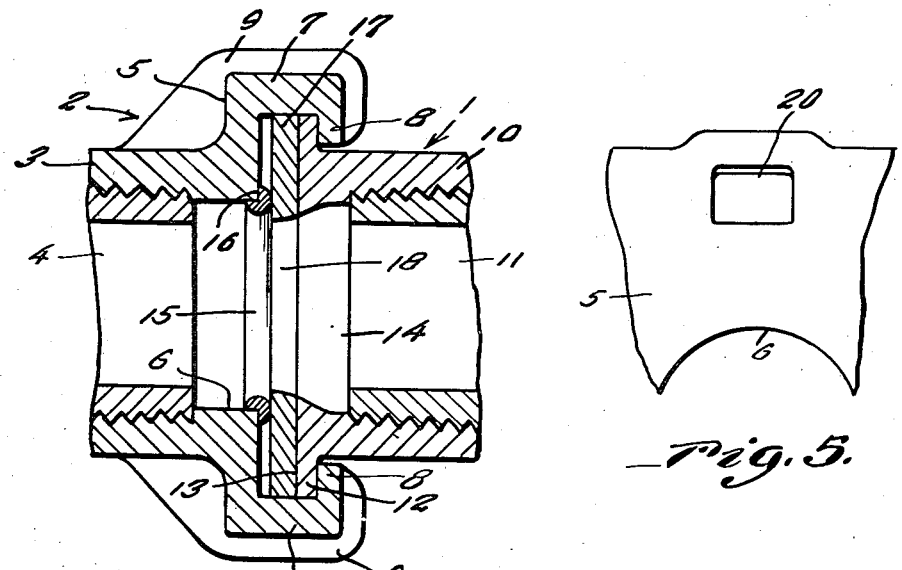
Inventor
E. C. Elkins Oct. 20, 1936. E. C. ELKINS 2,057,771
PIPE COUPLING
Filed April 7, 1936 2 Sheets-Sheet 2
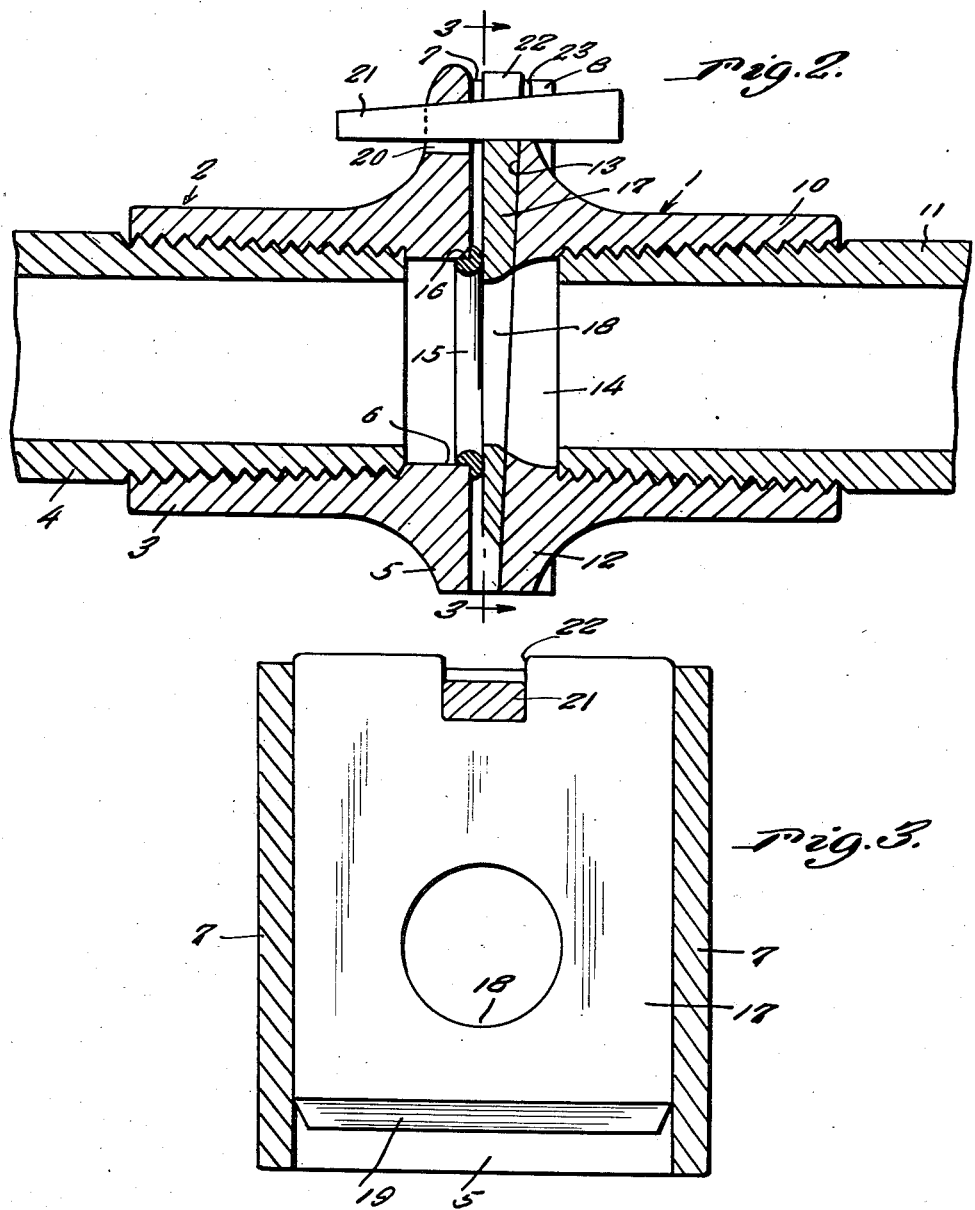
Inventor
E. C. Elkins
By Clarence A. O'Brien and
Hyman Berman
Attorneys Patented Oct. 20, 1936

2,057,771

UNITED STATES PATENT OFFICE 2,057,771

PIPE COUPLING

Elmer C. Elkins, Palestine, Tex., assignor of one-half to Lloyd Mize, Palestine, Tex.

Application April 7, 1936, Serial No. 73,157

3 Claims. (Cl. 285—144)

The present invention relates to new and useful improvements in pipe couplings and has for one of its important objects to provide, in a manner as hereinafter set forth, a device of this character which may be expeditiously connected without the use of bolts and nuts.

Another very important object of the invention is to provide a coupling of the character described which may be readily coupled or uncoupled and which, when coupled, will form a leak-proof joint.

Still another important object of the invention is to provide a pipe coupling of the aforementioned character comprising male and female members, together with novel means for positively locking said members together.

Other objects of the invention are to provide a pipe coupling which will be comparatively simple in construction, strong, durable, highly efficient and reliable in use, compact, light in weight and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:—

Figure 1 is a view in side elevation of a pipe coupling constructed in accordance with the present invention.

Figure 2 is a view in vertical longitudinal section through the invention.

Figure 3 is a cross sectional view, taken substantially on the line 3—3 of Figure 2.

Figure 4 is a fragmentary view in horizontal section, taken substantially on the line 4—4 of Figure 1.

Figure 5 is a fragmentary view in front elevation of an upper portion of the female member.

Figure 6 is a detail view in perspective of the locking key.

Referring now to the drawings in detail, it will be seen that the embodiment of the invention which has been illustrated comprises male and female members which are designated, respectively, by the reference numerals 1 and 2. The female member 2 includes an internally threaded collar 3 for the reception of the pipe 4. On one end of the collar 3 is a plate 5 having therein a centrally located, circular opening 6. Projecting forwardly from the vertical side portions of the plate 5 are flanges 7 which are provided with inturned ribs 8. Reinforcements 9 are provided on the female member 2 for the flanges 7, ribs 8, etc.

The male member 1 comprises an internally threaded collar 10 for the reception of the pipe 11. On one end of the collar 10 is a polygonal plate 12 which is adapted to be slipped between the flanges 7 and behind which the inturned ribs 8 are engageable in the manner shown to advantage in Figure 4 of the drawings. The plate 12 includes an inclined outer face 13. The plate 12 is further provided with a centrally located, substantially tapered opening 14.

The reference numeral 15 designates a gasket of suitable material, such as rubber, which is mounted in one end portion of the opening 6 in a manner to project from the plate 5. The gasket 15 has formed therein a groove 16 for the reception of the plate 5.

Driven between the plates 5 and 12 is a tightening wedge 17 having an opening 18 therein. The opening 18 communicates with the openings 14 and 6 and is formed to constitute a continuation of the former. This is best seen in Figure 4 of the drawings. The lower end of the wedge 17 is beveled, as at 19, to prevent said wedge from damaging the gasket 15 when said wedge is inserted.

The upper portion of the plate 5 has formed therein a polygonal opening 20 for the reception of a key 21, the upper side of which is tapered or inclined. The key 21 is engageable in a notch or recess 22 which is provided therefor in the upper end of the wedge 17. The upper portion of the plate 12 is also provided with a notch or recess 23 which accommodates the key 21.

It is thought that the operation of the invention will be readily apparent from a consideration of the foregoing. With the gasket 15 mounted in position, the plate 12 is slipped between the flanges 7. The wedge 17 is then inserted between the plates 12 and 5 and driven home to tighten the joint and bring the opening 18 in said wedge into alignment with the opening 14. It will be observed that the gasket 15 is now engaged with the wedge 17 around the opening 18 in said wedge. The locking key 21 is then driven into the opening 20 in the upper portion of the plate 5 for positively securing the wedge 17 in position, said locking key being slidably engaged in the notches or recesses 22 and 23. The operation has now been completed. Of course, to uncouple the members 1 and 2, the key 21 is simply knocked out of the opening 20 and the wedge 17 is removed. The wedge 17 travels on the inclined face 13 of the plate 12.

It is believed that the many advantages of a pipe coupling constructed in accordance with the present invention will be readily understood, and although a preferred embodiment of the invention is as illustrated and described, it is to be understood that changes in the details of construction and in the combination and arrangement of parts may be resorted to which will fall within the scope of the invention as claimed.

What is claimed is:—

1. A pipe coupling comprising male and female members, said female member including a plate having an opening therein, flanges projecting from said plate, inturned ribs on said flanges, a gasket mounted in the opening and projecting outwardly from the plate, the male member including a plate slidably engageable between the flanges, the ribs being engageable behind the second-named plate, said second-named plate including an inclined face, and a wedge engaged between the plates and bearing against the gasket.

2. A pipe coupling comprising male and female members, said female member including a collar, a plate on one end of said collar, said plate having an opening therein, flanges projecting from the plate, inturned ribs on said flanges, the male member comprising a collar, a plate on one end of the second-named collar, said plate being engageable between the flanges, the ribs being engageable behind the second-named plate, a wedge engageable between the plates, the first-named plate also having a polygonal opening therein, and a key, for locking the wedge and second-named plate in position, engageable in the opening, said second-named plate and the wedge having recesses therein accommodating the key.

3. A pipe coupling comprising male and female members, the female member including a plate having a centrally located opening therein, flanges projecting from said plate, inturned ribs on said flanges, a gasket mounted in the outer end portion of said opening, said gasket being substantially in the form of a three-quarter segment in cross section, the male member including a plate slidably engageable between the flanges and having a substantially tapered opening therein, the ribs being engageable behind the second-named plate, and a wedge engageable between the plates and having a substantially tapered opening therein constituting a continuation of the second-named opening.

ELMER C. ELKINS.